US012607032B2

(12) United States Patent
 Lewis

(10) Patent No.: US 12,607,032 B2
(45) Date of Patent: Apr. 21, 2026

(54) PORTABLE ONE-PERSON HANGING BLIND

(71) Applicant: Delaney Lewis, Downsville, LA (US)

(72) Inventor: Delaney Lewis, Downsville, LA (US)

( * ) Notice: Subject to any disclaimer, the term of this patent is extended or adjusted under 35 U.S.C. 154(b) by 0 days.

(21) Appl. No.: 18/614,233

(22) Filed: Mar. 22, 2024

(65) Prior Publication Data

US 2024/0341298 A1     Oct. 17, 2024

Related U.S. Application Data

(60) Provisional application No. 63/454,245, filed on Mar. 23, 2023.

(51) Int. Cl.
| | |
|---|---|
| *A01M 31/02* | (2006.01) |
| *A45F 3/26* | (2006.01) |
| *A45F 4/04* | (2006.01) |
| *E04H 15/00* | (2006.01) |
| *E04H 15/04* | (2006.01) |
| *E04H 15/44* | (2006.01) |
| *E04H 15/54* | (2006.01) |
| *A45F 4/02* | (2006.01) |

(52) U.S. Cl.
CPC ......... *E04H 15/001* (2013.01); *A01M 31/025* (2013.01); *A45F 3/26* (2013.01); *A45F 4/04* (2013.01); *E04H 15/04* (2013.01); *E04H 15/44* (2013.01); *E04H 15/54* (2013.01); *A45F 2004/026* (2013.01)

(58) Field of Classification Search
CPC ................................ A01M 31/025; A45F 3/26
See application file for complete search history.

(56) References Cited

U.S. PATENT DOCUMENTS

| | | | | | |
|---|---|---|---|---|---|
| 2,992,503 | A | * | 7/1961 | Webb .................. | A01M 31/025 135/901 |
| 3,545,461 | A | * | 12/1970 | Carlson .................. | E04H 15/04 135/117 |
| 4,221,429 | A | * | 9/1980 | Wade ........................ | A45F 3/26 297/277 |
| 4,761,908 | A | * | 8/1988 | Hayes .................. | E04H 15/001 43/1 |
| 4,776,503 | A | * | 10/1988 | Sink .................... | A01M 31/025 182/187 |
| 4,782,616 | A | * | 11/1988 | Hambleton ......... | A01M 31/025 D25/16 |
| 4,825,578 | A | * | 5/1989 | Robinson ............ | A01M 31/025 135/90 |
| 4,886,143 | A | * | 12/1989 | Dubroc .................. | A01M 31/02 182/187 |
| 5,528,849 | A | * | 6/1996 | Plinta .................. | A01M 31/025 135/901 |
| 6,510,922 | B1 | * | 1/2003 | Hodnett .............. | A01M 31/025 182/135 |

(Continued)

*Primary Examiner* — Christopher D Hutchens
(74) *Attorney, Agent, or Firm* — Gardner IP Law, PC

(57) ABSTRACT

A portable, one-person hanging blind comprising a tree support for attachment to a portion of a tree, an upper portion supported by the tree support, a chair suspended beneath the upper portion, and a camouflage shroud for concealing a user seated on the chair, the blind being convertible between a disassembled, compact configuration and an assembled, extended configuration, and wherein the blind is roughly cylindrical and sized to accommodate a single user, and wherein the blind is configured and adapted to be rotated by user seated on the seat.

16 Claims, 11 Drawing Sheets

(56) References Cited

U.S. PATENT DOCUMENTS

| | | | |
|---|---|---|---|
| 7,246,630 B1* | 7/2007 | Ransom ................ | E04H 15/001 |
| | | | 135/117 |
| 9,254,446 B2* | 2/2016 | Lacy ................... | A63H 33/008 |
| 9,426,978 B1* | 8/2016 | Galloway ............... | A45C 9/00 |
| 11,800,923 B1* | 10/2023 | Shirley-Smith ...... | A47C 3/0255 |
| 2004/0140157 A1* | 7/2004 | Undi ................... | A01M 31/025 |
| | | | 182/187 |
| 2006/0005870 A1* | 1/2006 | Maddox ............... | E04H 15/001 |
| | | | 135/90 |
| 2006/0249640 A1* | 11/2006 | Hanson .............. | A01M 31/025 |
| | | | 135/90 |
| 2007/0017744 A1* | 1/2007 | Jacks ................. | A01M 31/025 |
| | | | 182/187 |
| 2007/0144570 A1* | 6/2007 | Cooper .............. | A01M 31/025 |
| | | | 135/90 |
| 2008/0217104 A1* | 9/2008 | Bergeron ........... | A01M 31/025 |
| | | | 182/142 |
| 2012/0080916 A1* | 4/2012 | Stringer ................... | A45F 3/26 |
| | | | 297/217.1 |
| 2016/0083972 A1* | 3/2016 | Hayes ................ | A01M 31/025 |
| | | | 135/121 |
| 2017/0215408 A1* | 8/2017 | Swanson ............ | A01M 31/025 |
| 2017/0339941 A1* | 11/2017 | Burchfield ........... | E04H 15/001 |
| 2018/0340346 A1* | 11/2018 | Bottome .................. | B66C 1/16 |

* cited by examiner

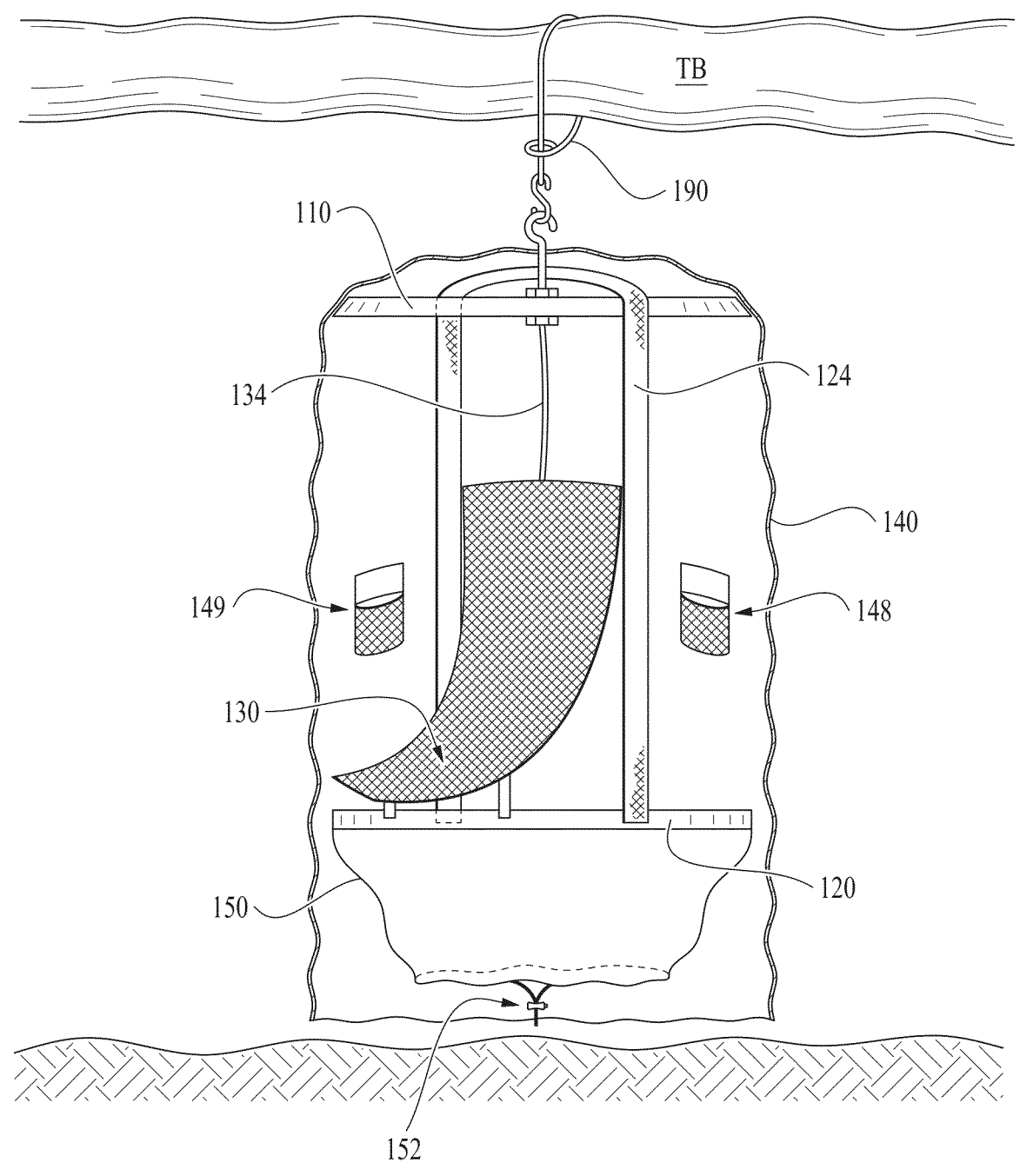
_FIG. 2A_

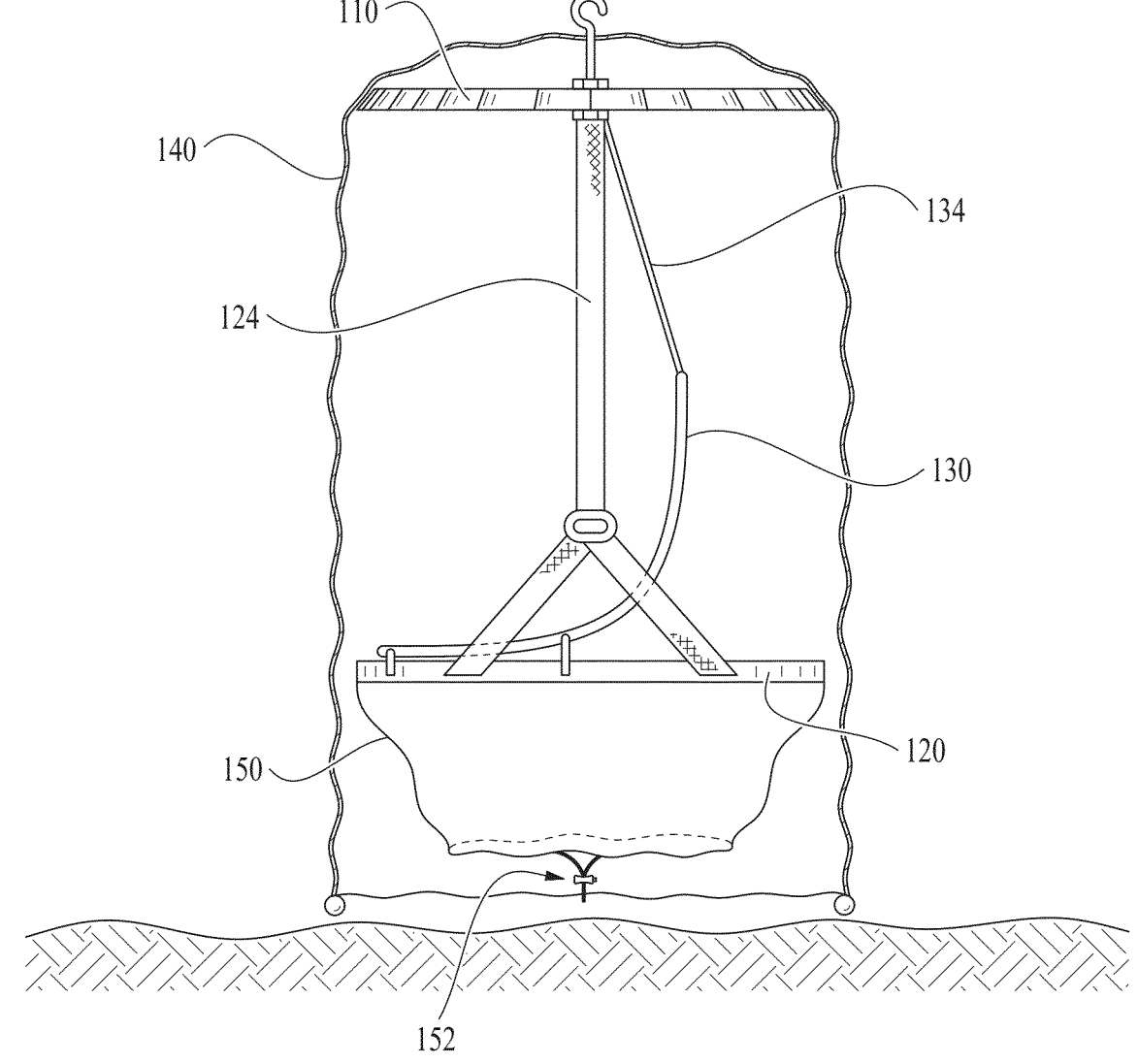
_Fig.3_

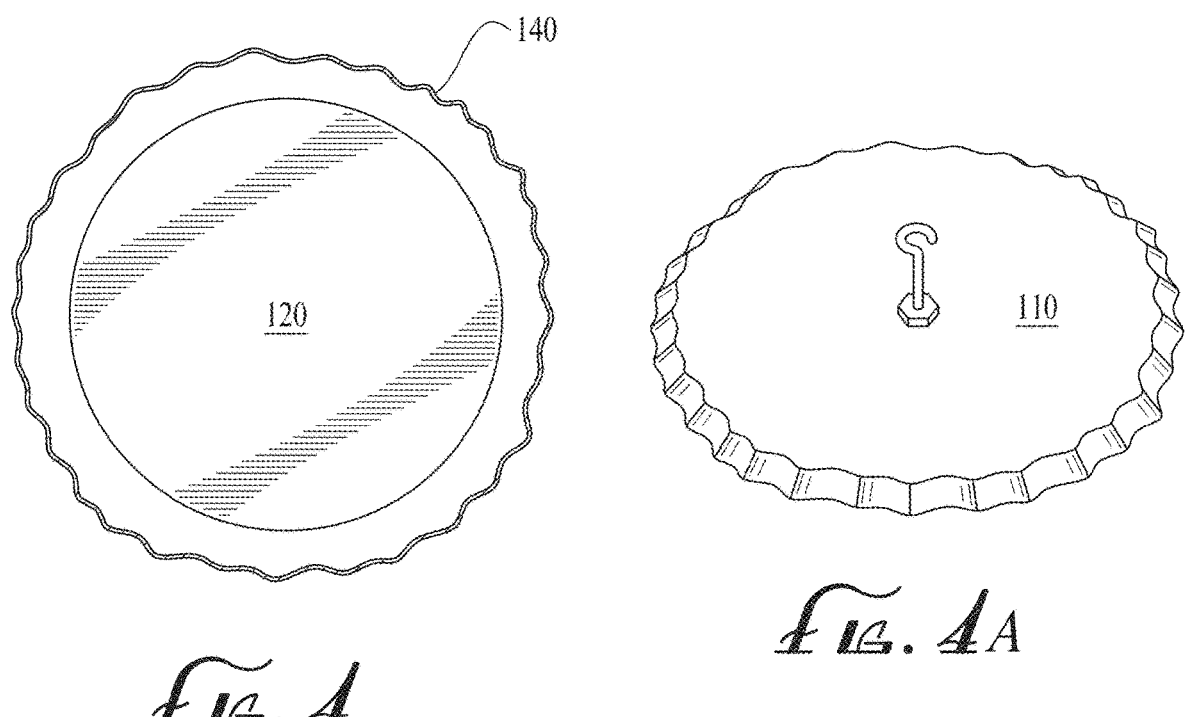
_Fig. 1_
_Fig. 4A_
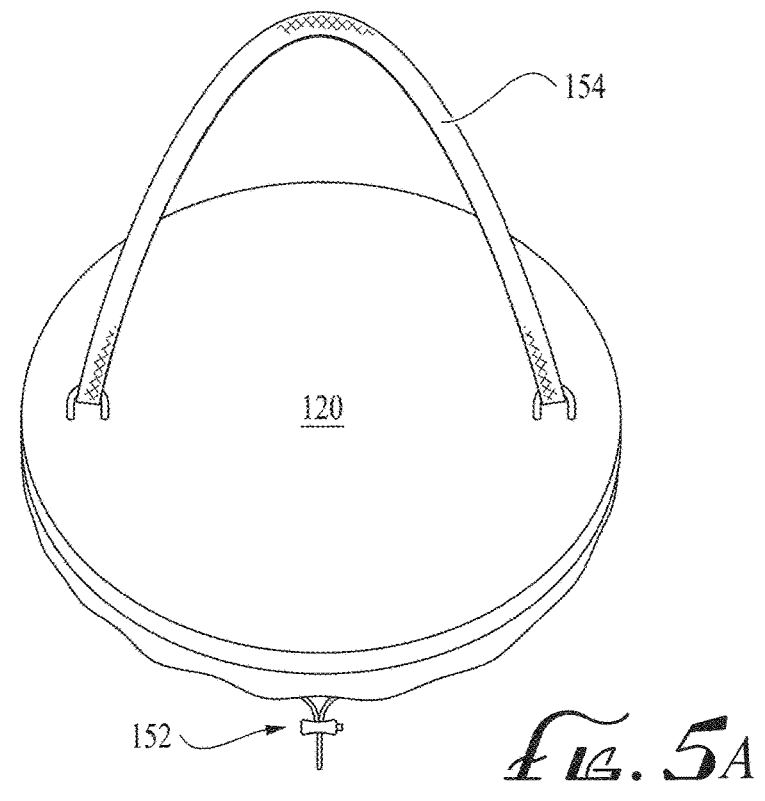
_Fig. 5A_

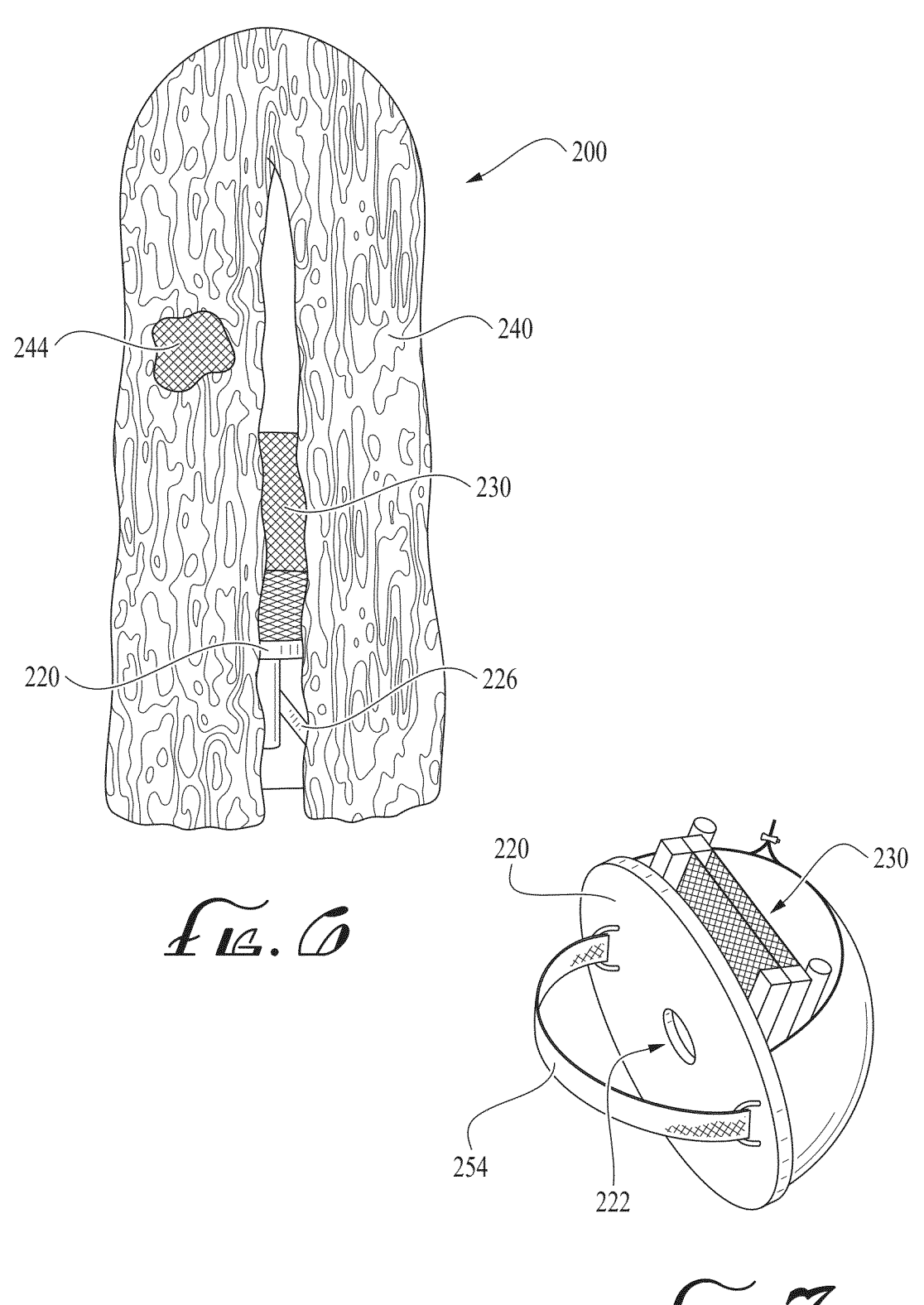
_FIG. 6_
_FIG. 7_

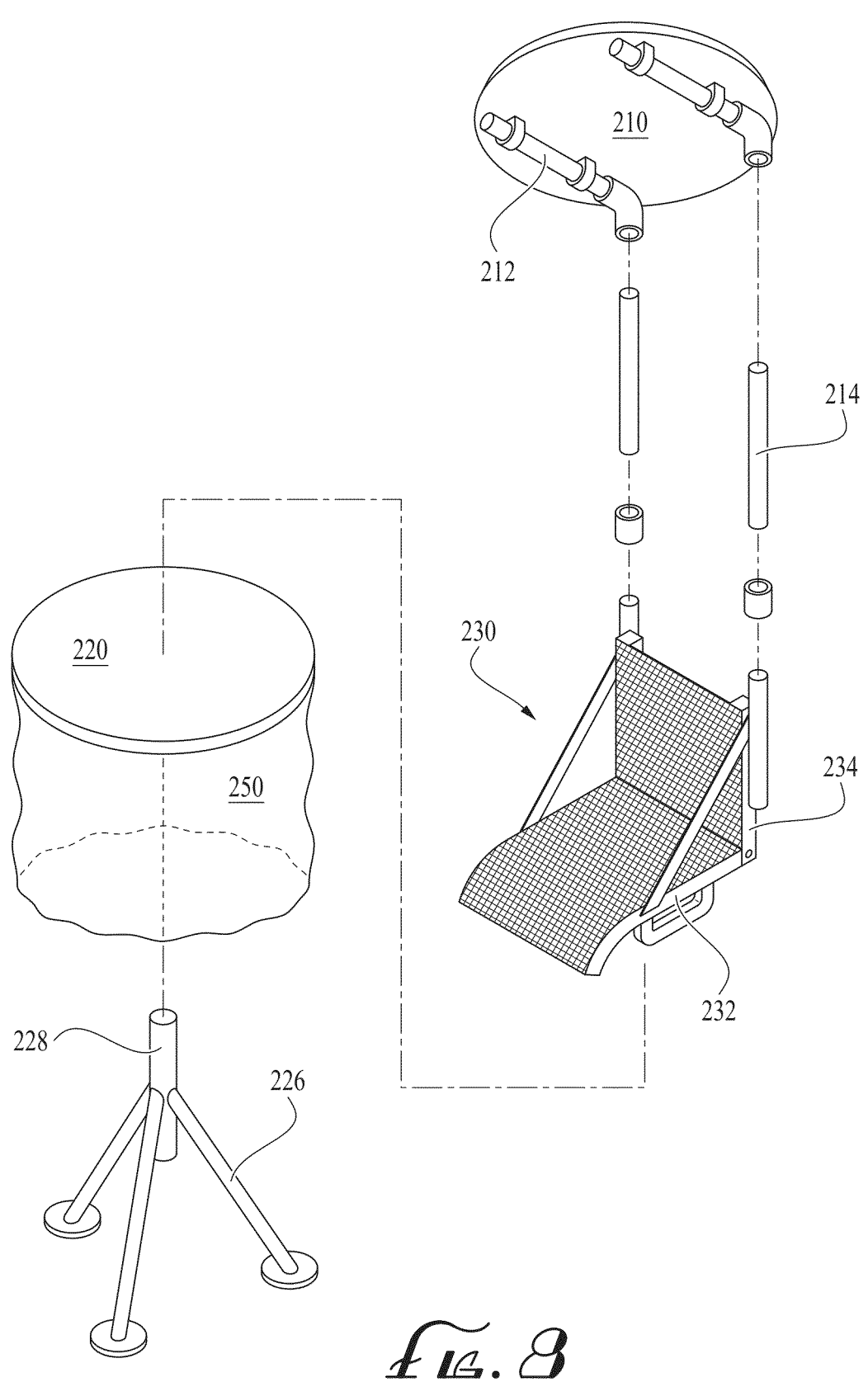
_FIG. 8_

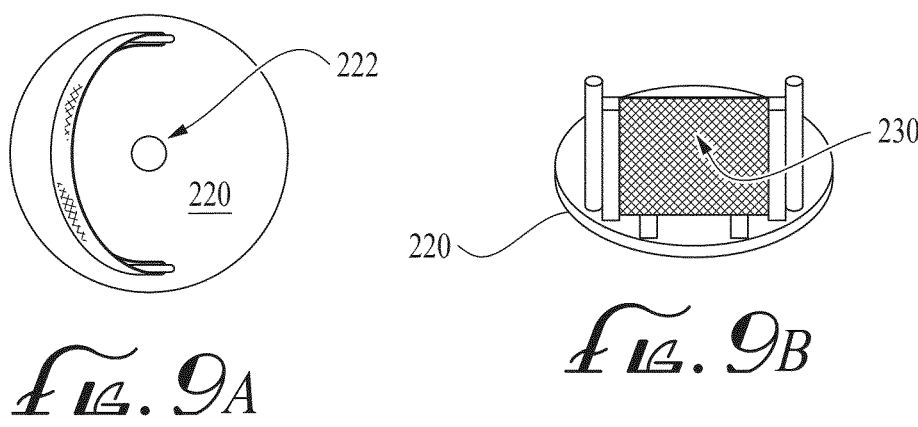
*fig. 9A*
*fig. 9B*
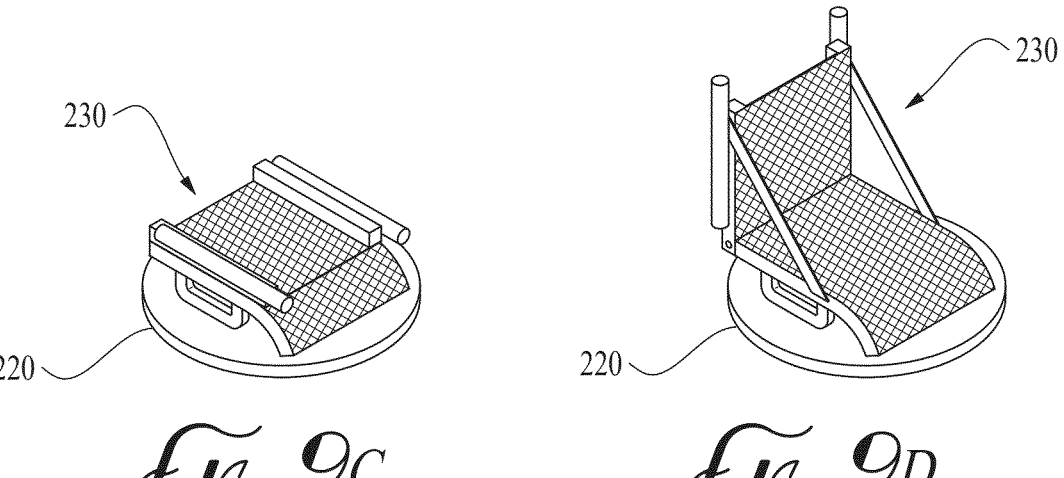
*fig. 9C*
*fig. 9D*
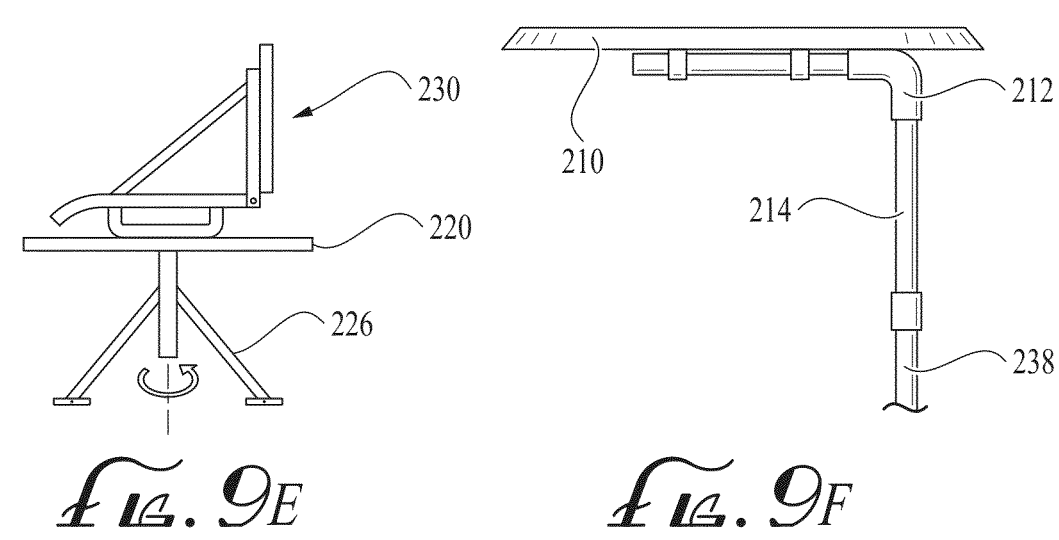
*fig. 9E*
*fig. 9F*

300

PORTABLE ONE-PERSON HANGING BLIND

TECHNICAL FIELD

The present invention relates generally to blinds and, in particular, to a portable, rotating single-person blind.

BACKGROUND

In the past, typical hunting or photography blinds have tended to be relatively large, free-standing arrangements, similar to a tent, with camouflage exteriors and observation/shooting windows. Typically, these free-standing blinds have been constructed to allow multiple users to occupy the blind at the same time and typically are used while standing.

In more recent years, a single person blind has come on the market from Stringer Outdoors (www.stringeroutdoors-.com/products). As described on their website, the blind is a "ground blind consisting of a Cocoon outer covering surrounding a hunting hammock chair on a Cocoon hanger which is attached to a tree or branch, all of which is transported in a lightweight bag." The product is in the nature of a bag, complete with a floor that rests upon the ground. It also includes a rain shield, shaped like a large hat brim, to help keep rain from falling in through the opening. It uses rather short mounting brackets to secure the blind close to the trunk of a tree. This blind is positioned rather close to the tree such that the back of the user rests or nearly rests against the tree trunk. The net result of this configuration is that the chair rotates relative to the blind and the blind can be rotated only to a limited extent.

SUMMARY

Generally described, the present invention relates to a portable, one-person blind or concealment device designed to camouflage its user or blend in with his/her surrounding environment and reduce the chances of detection, for example, by animals while hunting and taking photographs.

In a first example embodiment, the portable, one-person hanging blind includes a chair and a camouflage shroud for concealing a user seated on the chair. The blind is convertible between a disassembled, compact configuration and an assembled, extended configuration. The blind is roughly cylindrical and sized to accommodate a single user. Further, the blind is configured to allow the seated user to rotate the blind rather fully, preferably 360 degrees, if desired.

In a second example embodiment, the one-person, pivoting blind can be carried as a backpack, and includes a seat, a semi-round upper structure of a first diameter with a tapered round upper shape, and a generally round lower structure of a second diameter equal to or larger than the first diameter secured to the bottom of the seat, wherein the upper and lower structures are spaced a predetermined or specified distance apart. Preferably, the distance between the upper and lower structures is sufficiently large to accommodate a single person. A camouflage fabric or material encompasses the upper structure and the lower structure and creates an interior space for a person to occupy.

In a third example embodiment, the present invention relates to a portable backpack and blind system comprising a backpack configuration and a blind configuration. The portable backpack and blind system comprises a backpack and a blind assembly. The blind assembly comprises a rotating chair and a camouflage shroud for concealing a user seated on the chair. The blind assembly is convertible between a disassembled, compact configuration and an assembled, extended configuration. In the backpack configuration, the backpack is configured for encasing and storing therein the blind assembly in the disassembled, compact configuration. In the blind configuration, the blind assembly is roughly cylindrical and sized to accommodate and conceal therein a single user in the assembled, extended configuration. Preferably, in the backpack configuration, the backpack is configured for storing more than just the blind assembly. Preferably, the backpack has enough storage space for items/gear in addition to the blind assembly to allow the hunter or photographer to dispense with the need for a fanny pack or his or her existing backpack. The backpack is configured for carrying the backpack over the user's shoulders or by one or more handles.

Preferably, the upper structure has an undulating outer shape coupled with the fabric or material to create a three-dimensional shape. The seat is positioned between the upper and lower structures and within the interior space created by the camouflage fabric or material. Preferably, the blind is configured to pivot or rotate, as a whole, about a vertical or longitudinal axis. In some example embodiments, the seat is suspended from a bracket with a gambrel that connects to a tree with the upper and lower structures and camouflage fabric or material.

Preferably, the one-person blind includes one or more viewing windows for enabling the user to see out. Preferably, the viewing windows are provided with a mesh screen which allows the user to see out rather well, but which nonetheless conceals the user fairly well from a distance. Preferably, the viewing windows have an amorphous or blob-like shape, rather than a polygon geometric shape with straight lines and sharp corners.

Optionally, the one-person blind includes internal pockets positioned on the inside of the fabric for storing cell phones, food, camera gear, ammo, etc. Preferably, the camouflage pattern on the outside of the fabric can be custom-suited to the local environs, such as tree bark, tall grasses, etc.

Preferably, the one-person blind includes a weighted skirt to help the lower part of the camouflage fabric reach the ground and avoid sunlight from shining underneath the blind. The weighted skirt also helps to keep the camouflage fabric more stable in the presence of wind forces. Preferably, the weight in the weighted skirt is positioned some distance above the end of the fabric, preferably between about 2 and 8 inches.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 2A shows the hanging blind of FIG. 1 secured to a tree branch according to another example embodiment of the present invention.

FIG. 3 is side sectional view of the hanging blind of FIG. 1.

FIG. 4 is a cross-section view of the hanging blind of FIG. 1, taken along line 4-4 in FIG. 1, while FIG. 4A is a perspective view of an upper platform portion of the hanging blind of FIG. 1.

FIG. 5A is a bottom perspective view of the hanging blind of FIG. 1 in a storage or carrying configuration.

FIG. 6 shows a free-standing blind according to yet another example embodiment of the present invention.

FIG. 7 shows the underside of a lower platform portion of the free-standing blind of FIG. 6.

FIG. 8 is an exploded view of the free-standing blind of FIG. 6.

FIGS. 9A-9F are various views of the seat and lower platform of the free-standing blind of FIG. 6.

DETAILED DESCRIPTION OF EXAMPLE EMBODIMENTS

Figure 1:
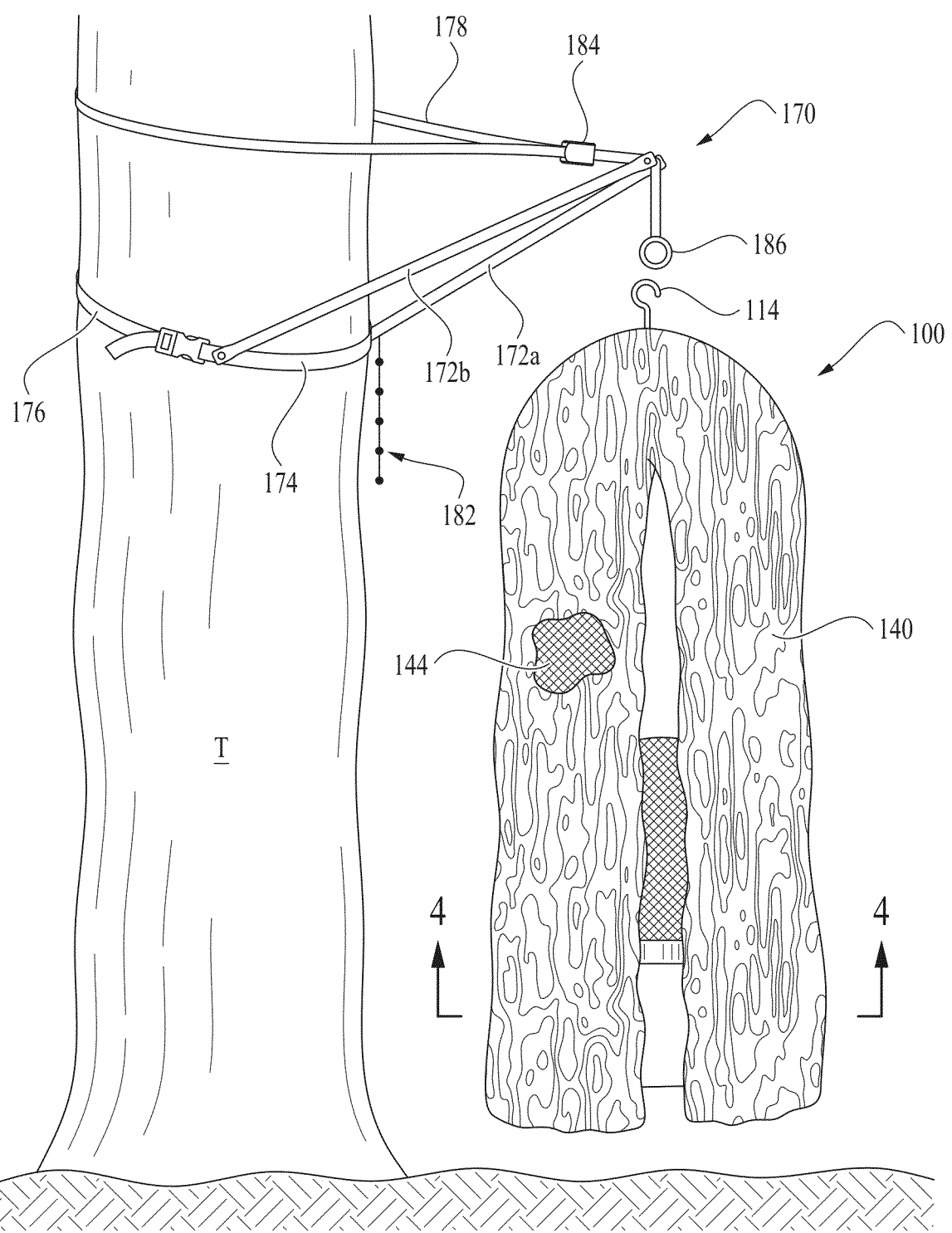
FIG. 1 shows a hanging blind secured to a trunk of a tree according to an example embodiment of the present invention.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Generally described, the present invention relates to a blind or concealment device designed to allow its user to camouflage or blend in with the surroundings and reduce the chances of detection, for example, by animals while hunting and taking photographs. More specifically, the present invention relates to a portable and rotatable blind generally configured to accommodate and conceal a single user from his/her surroundings. The portable, one-person blind generally comprises a chair and a camouflage shroud or cover for concealing the user seated on the chair. Generally, the chair and the blind are rotatable together about a vertical axis so that the user can rotate or spin substantially in position to face any direction. Further, the blind is configured to allow the seated user to rotate the blind rather fully, preferably 360 degrees, if desired.

Preferably, the blind is adapted and configured to roughly have the appearance of the surrounding environment where the blind is used. For example, the blind may be adapted and configured to roughly have the appearance of a trunk of a tree to blend in with other trees when the blind is used in a wooded area to stay hidden while hunting or taking photographs of animals. Preferably, the camouflage shroud is made from a woven textile or fabric comprising a weave or knit pattern such that the user is able to see through the spacings in the weave while in close proximity thereto (for example, within a foot or so from the shroud) but the user is concealed by the shroud when viewed by others from afar (for example, more than several feet from the shroud) on the other side of the shroud. Alternatively, the shroud may be made from other suitable materials, such as for example films or sheeting, which provide one-way visibility. Optionally, the blind may comprise a window or an opening 144, which may or may not be concealed, to provide a clearer view. Preferably, as seen in various ones of the Figures, the blind has a radiused or beveled or gradual transition from the vertical sides to the top portion, to avoid an abrupt transition. The present inventor has found that the abrupt transition tends to stand out in natural settings and is to be avoided, if possible. Thus, a non-abrupt transition from the sides to the top portion is preferred.

Preferably, the upper structure has an undulating outer shape coupled with the fabric or material to create a three-dimensional shape. The seat is positioned between the upper and lower structures and within the interior space created by the camouflage fabric or material. Preferably, the blind is configured to pivot or rotate, as a whole, about a vertical or longitudinal axis. In some example embodiments, the seat is suspended from a bracket with a gambrel that connects to a tree with the upper and lower structures and camouflage fabric or material. In other example embodiments, the rotating seat is supported by legs on the ground and is free-standing with the upper structure and camouflage fabric or material supported with brackets connected to the seat.

Preferably, the one-person blind includes one or more viewing windows for enabling the user to see out. Preferably, the viewing windows are provided with a mesh screen which allows the user to see out rather well, but which nonetheless conceals the user viewed from a distance. Preferably, the viewing windows have an amorphous or blob-like shape, rather than a polygon geometric shape with straight lines and sharp corners so as to not present an unnatural appearance.

Generally, the blind is convertible between a first, disassembled or compacted configuration and a second, assembled or extended configuration. In the first, compacted configuration, the blind is collapsed or disassembled for easy storage and/or transportation. In the second, extended configuration, the blind is roughly cylindrical and/or may comprise a slightly tapered profile, with the blind being broader at the bottom than at the top and is sized to accommodate a single user. However, it will be appreciated by persons skilled in the art that the blind may be of any suitable shape or profile and/or may be adapted or configured to accommodate one or more users.

Preferably, the blind is configured to blend in with the natural environment. For example, the blind may have the appearance of a tree or a tree stump. Preferably, the blind is similar in size to a medium size tree or stump while having sufficient interior space to accommodate a single person. Preferably, the blind may be rotated or spun in place by the user without having to exit the blind. Preferably, the exterior profile of the blind is fairly consistent while rotating (for example, like a cylinder) so that rotation of the blind is less discernable by wildlife. Preferably, the blind is portable and lightweight and can be easily stored and carried in a single carrying case, such as for example as a backpack. Preferably, the blind is provided with external folds or wrinkles to mimic the uneven surface of tree bark.

Preferably, the blind is adapted and configured to use an interchangeable outer camouflage shell. The camouflage shell can be changed to suit the type of environment that it is being used in, such as pine forests, hardwood forests, grasslands, etc. Also, preferably, the blind is adapted and configured to accommodate right-handed or left-handed shooters or archers by simply adjusting the orientation of the blind opening into a preferred position relative to the seat. The adjustability of the blind in orientation to the seat allows each shooter or archer to customize the blind to their preferred position (right, left or in front) and any aiming angle (from 0 degrees to 90 degrees left or right from the seat position).

FIGS. 1-5 show a portable, one-person hanging blind 100 according to a first example embodiment of the present invention. The hanging blind 100 generally comprises an upper platform or portion 110 and a lower platform or portion 120 suspended beneath the upper portion 110, and a foldable or collapsible seat or chair 130 provided between the upper and lower portions 110, 120. The upper platform 110 comprises a hook or eye 114, or other similar securing means, to allow the upper platform to be supported from above and one or more flexible suspension straps 124 extending down from the upper platform for supporting the seat 130 and/or lower platform 120. In the depicted embodiment, the seat 130 is a foldable fabric seat with a first, lower end attached or secured to a first, top surface of the lower platform 110 and a second, upper end (generally opposite the first, lower end) of the chair 130 connected to and suspended from a bottom surface of the upper platform 120 by one or more seat suspension straps or cords 134, as shown in FIG. 2A and FIG. 3. Preferably, the lower end of the chair 130 is attached to or near an periphery of the lower platform 120 while the upper end of the chair 130 is connected, directly or indirectly via a support strap or cord, to or near the center of the upper platform such that the seat 130 is at least partially sloped or angled to provide more support when the user is seated in the seat 130. Alternatively, the upper end may be secured, directly or indirectly via a support strap or cord, to a position along a periphery of the upper platform and generally across from the position where the lower end of the seat is secured to the lower platform such that the seat 130 is sloped or angled. In other example embodiments, the seat 130 may be removably attached or secured to the lower and upper platforms by any other suitable method known in the art.

The hanging blind 100 also comprises a shroud or cover 140 for concealing a user seated on the chair 130. In example embodiments, the shroud 140 extends from above the upper platform 110 and drapes downwardly towards the lower platform 120. Preferably, the shroud 140 extends to or close to the ground and covers substantially all sides of the blind except for a slit or opening for entering and exiting the blind 100, as best shown in FIG. 1. Optionally, the shroud may comprise zippers, loop-and-hook fasteners, buttons, or other similar fixtures for opening and closing the slit as desired. Preferably, the exterior of the shroud 140 comprises a pattern or design on at least the exterior surface to help blend in with the surrounding environment during use. For example, the shroud 140 may comprise a camouflage-patterned exterior depicting tree limbs and leaves to help blend in with the surrounding in a wooded area to help conceal the user's presence from animals while hunting or taking photographs.

As noted above, the hanging blind 100 is generally configured to be suspended from a portion of a tree. For example, as shown in FIG. 1 and FIG. 2A, the blind 100 may be suspended along a trunk of a tree with a tree support structure or assembly 170. The tree support 170 comprises a lower A-frame portion with a first frame member 172a and a second frame member 172b, each of the first and second frame members extending between a first, distal end and a second, proximal end, and wherein the first and second frame members are hingeably connected to one another at their distal ends. The first and second frame members are further connected by a flexible frame strap 174 extending between the proximal ends of the frame members 172a and 172b. In example embodiments, the frame members 172a and 172b are configured to hinge relative one another to accommodate varying tree trunk diameters. The present inventor has found that if the frame members 172a and 172b are at least about 22 to 24 inches in length, the blind is positioned sufficiently apart from the tree trunk to allow the blind to be big enough to house a typical user and still rotate. Preferably, the frame members 172a and 172b are about 22 to 30 inches in length. Most preferably, the frame members 172a and 172b are about 23 to 28 inches in length to enable the blind to be freely rotated while still being close enough to the tree trunk to have the tree trunk provide some visual obscurement of the blind.

The tree support 170 further comprises a flexible lower securing strap or cord 176 and a flexible upper securing strap or cord 178 which are configured to be wrapped around a portion of a tree, such as for example the trunk, to secure the A-frame portion substantially in place. In example embodiments, the lower tree securing strap 176 is configured to extend from the proximal end of one frame member and around the tree trunk and wherein the opposing end of the lower tree securing strap 176 is secured to the proximal end of the other frame member. In the depicted embodiment, for example, the lower tree securing strap 176 extends from the proximal end of the second support member 172b and around the tree trunk T to the proximal end of the first support member 172a. The free end of the lower tree securing strap 176 comprises a series of knots or stops spaced apart from one another. At its proximal end, the first support member 172a comprises a latch or catch for receiving and retaining one of the knots and keeping the lower strap 176 tightly wrapped around the tree trunk.

Similarly, the upper securing strap 178 helps secure the A-frame support portion to the tree and maintain the A-frame support portion at a desired level or angle. As shown in FIG. 1, a first end of the upper secure strap 178 is affixed to the A-frame support portion. To secure the upper securing strap 178, a second, free end (opposite the first end) of the upper secure strap 178 is wrapped around the tree-preferably, at an angle to the A-frame portion and above the lower securing strap 176 along the tree trunk- and secured back onto itself by sliding the free end through a strap buckle or clasp 184 which allows the upper securing strap 178 to be tightened or loosened by pulling or pushing the free end further through the buckle in one direction or the other. In example embodiments, the tree support 170 further comprises a hanging hoop or loop 186 for hooking or otherwise securing the hook 114 thereto and suspending the hanging blind 100 therefrom.

Optionally, the one-person blind includes internal pockets, for example, pockets 148, 149 shown in FIG. 2A, positioned on the inside of the fabric for storing cell phones, food, camera gear, ammo, etc. Preferably, the camouflage pattern on the outside of the fabric can be custom-suited to the local environs, such as tree bark, tall grasses, etc.

According to example embodiments, the tree support structure 170 is generally not required or needed to suspend the hanging blind 100 from a tree branch extending transversely from the tree trunk. As shown in FIGS. 2 and 3, the hanging blind 100 may be suspended from the transverse branch so long as a branch anchoring loop or strap 190 is secured around the branch and provides an anchor point to suspend the blind 100 therefrom.

Figure 2B:
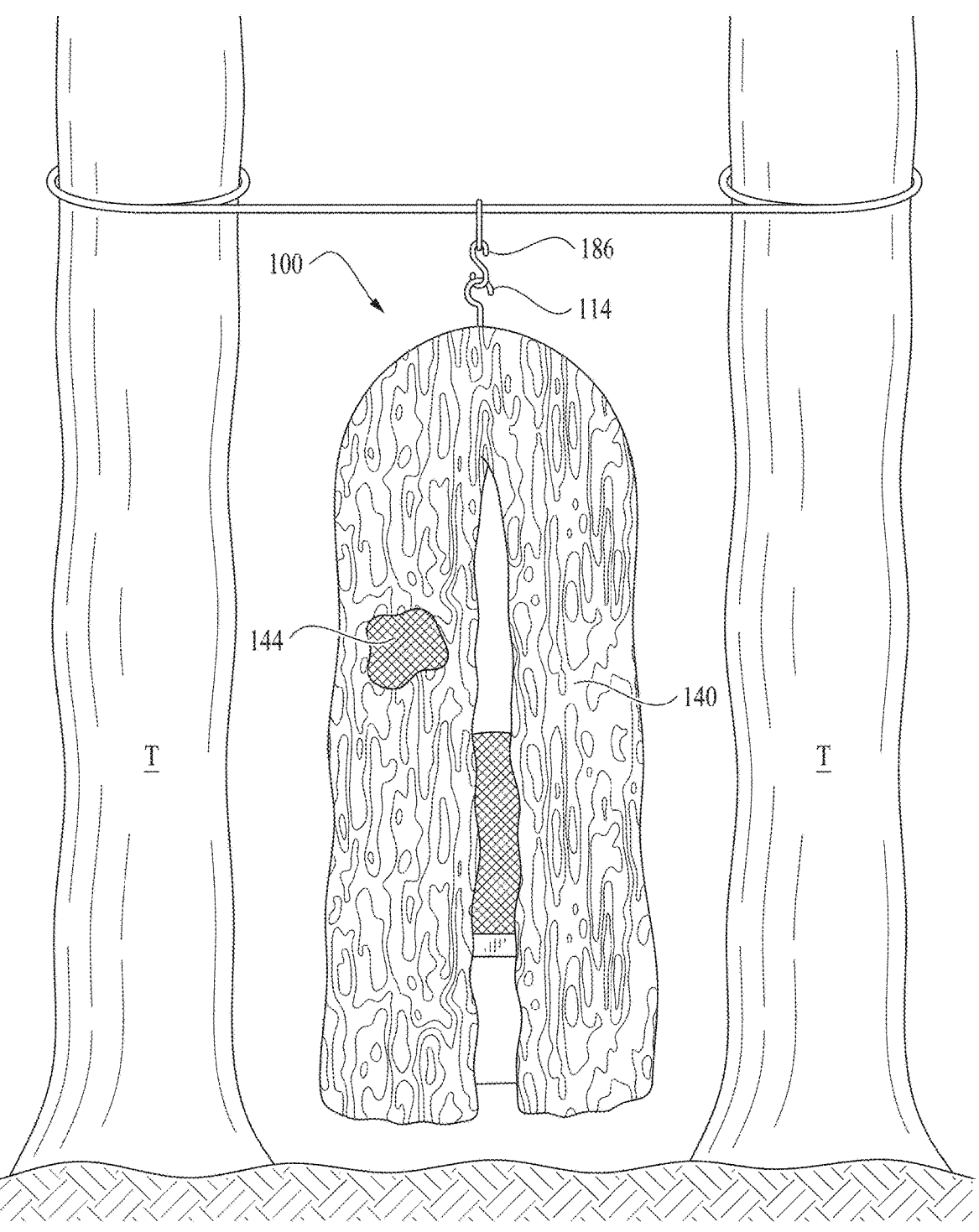
FIG. 2B shows the hanging blind of FIG. 1 secured to a line or rope extending between two trees according to another example embodiment of the present invention.

Similarly, as shown in FIG. 2B, the hanging blind 100 can be secured to a line or rope R extending between two trees T1 and T2 according to another example embodiment of the present invention.

In example modes of use, the upper platform 110 is suspended from a portion of a tree T using either the tree support 170 or anchor 190. In turn, the lower platform 120 and chair 130 are suspended from the upper platform 110, as shown in FIGS. 1-3. When the blind 100 is fully extended, the chair 130, being connected to the lower platform 120 at one end and the upper platform 110 at the opposite end, is stretched or extended at least partially at an incline to provide both bottom and lumber support when the user is seated in the chair 130. As described above, the camouflage cover 140 is preferably configured to provide 360-degrees of cover, although the cover can be adjusted to provide a slit for entering and exiting the blind 100, for providing a narrow unobstructed view, or for aiming a camera or weapon therethrough, as shown in FIG. 1. In some example embodiments, the cover 140 may comprise one or more windows or openings 144 to allow for better viewing or ventilation. Preferably, the windows or openings 144 have a blob-like shape or an amorphous shape. It is preferred that polygon shapes be avoided for the windows, with straight line and sharp corners, as such generally doesn't appear natural in the woods or grass fields and would "stick out" to an animal one is trying to observe or hunt.

In preferred embodiments, the cover 140 has an undulating or non-cylindrical exterior or outer profile so as to create a three-dimensional appearance or texture and thus appear more realistic, for example like a tree trunk covered in tree bark. For example, the cover 140 has a jagged or unsmooth cross-sectional profile, as shown in FIG. 4. This appearance or profile may be created by producing the cover from a fabric having width greater than the desired circumference of the blind, the width referring to the dimension of the fabric transverse to the height of the fabric measured from the top of the blind to the bottom of the blind when suspended during use. Preferably, as shown in FIG. 3 and FIG. 4A, the upper structure or upper platform 110 has an undulating outer shape to create a three-dimensional, undulating shape in the fabric cover 140, as depicted in FIG. 4. Thus, the fabric 140, draped over the upper platform 110, can take on a corresponding undulating shape. Alternatively, or additionally, the upper and/or lower platforms 110, 120 may have a jagged or non-smooth irregular profile such that the cover 140 takes on the same (or generally the same) jagged or non-smooth profile when cover 140 rests on the platform(s) or falls therefrom. Alternatively, or additionally, the cover 140 may comprise layers or patches of fabric to produce a three-dimensional exterior texture or appearance.

Figure 11:
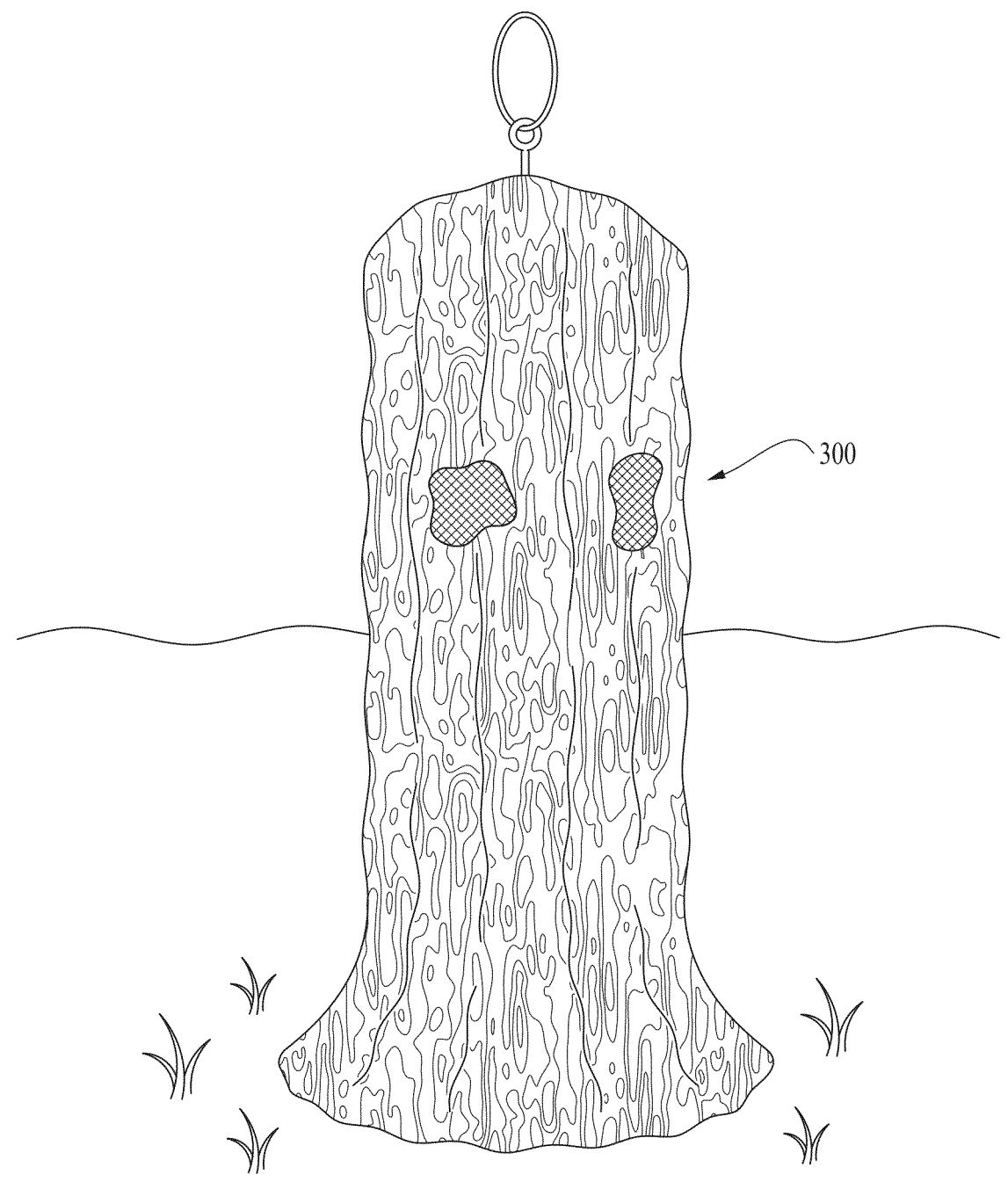
FIG. 11 shows a hanging blind for securement to a tree or between two trees, according to an example embodiment of the present invention.

Preferably, the one-person blind includes a weighted skirt 142 with weights 143 to help the lower part of the camouflage fabric 140 reach the ground and avoid sunlight from shining underneath the blind. The weighted skirt 142 also helps to keep the camouflage fabric more stable in the presence of wind forces. The weight 143 can be positioned at the very bottom of the fabric 140 or can be positioned some distance up from the very bottom. Preferably, the weight 143 in the weighted skirt 142 is positioned some distance above the end of the fabric, preferably between about 2 and 8 inches. The weighted skirt 142 ensuring the camouflage fabric 140 reaching the ground facilitates the fabric splaying out at the bottom, mimicking the shape of a tree trunk at the ground. This last feature is best seen in FIG. 11.

In example embodiments, the cover 140 may be configured or have the appearance to match the surroundings in which the blind 100 will be used. For example, the cover 140 may comprise images or additional patches of fabric thereon mimicking leaves on a tree for use for example in a wooden environment, patches or images mimicking tall grass for use for example in a grassy environment, and/or an image of a water surface for use for example in or nearby a lake, river or bodies of water. In some example embodiments, the blind 100 may comprise a plurality of interchangeable covers 140, each with a different design or appearance for use in different environments. In still other example embodiments, the cover 140 may have one appearance or design on one side and a different appearance or design on the other opposite side. In yet other example embodiments, the covers 140 may be configured for cooperative use for example by layering the covers 140 in different ways. Further, the cover can be adapted to be easily removed and replaced, to facilitate changing the cover to suit the local environs of use.

While suspended from either a tree support structure 170 secured to a tree trunk or from a branch anchor 190 around a tree branch, the hanging blind 100 can be freely rotated about its vertical, axial axis by the user (i.e., using his/her feet) without having to exit the blind 100, which allows the user to change his/her view without having to exit the blind 100 and risk being detected by for example an animal or others from which the user intended to hide.

Figure 5B:
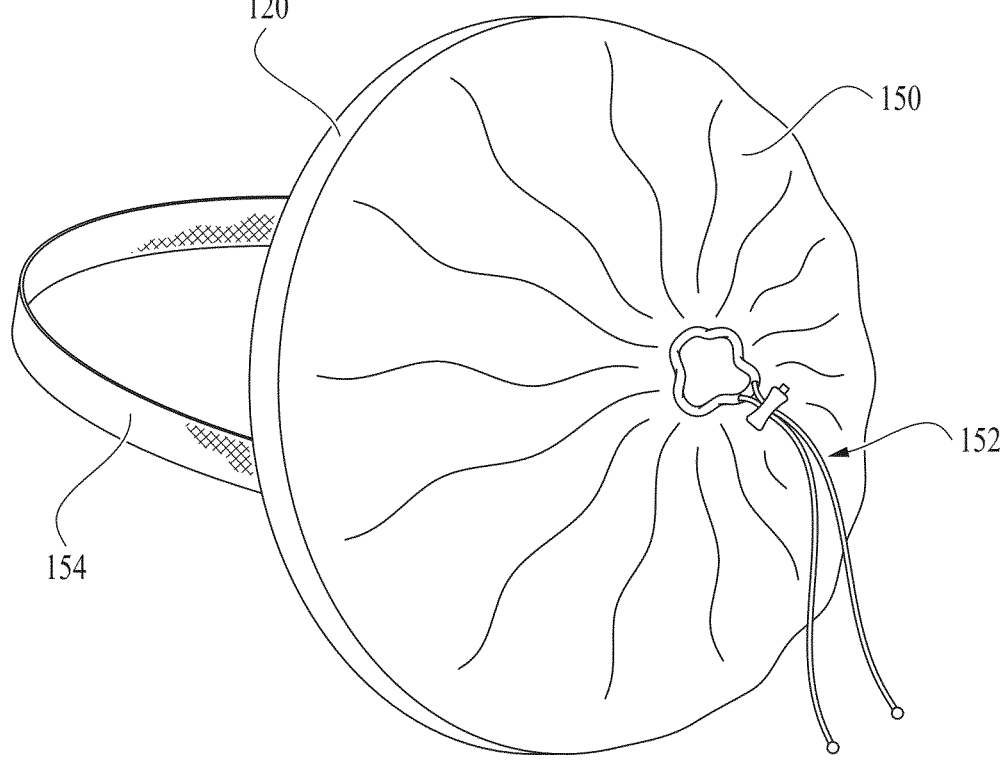
FIG. 5B is a top perspective view of the hanging blind of FIG. 4.

When no longer needed, the blind 100 may be collapsed by removing the blind 100 from the tree and bringing together the top and bottom platforms 110, 120 with or without the chair 130 removed from therebetween. Once the blind 100 is collapsed, a skirt 160 secured around the periphery of the lower platform 120 can be used to easily cover and store the blind 100 for future use. For example, as shown in FIGS. 4 and 5, the skirt 150 is secured around the periphery of the lower platform and extends therefrom. The exposed edge of the skirt 150 is hemmed and a drawstring 152 is threaded therethrough. In example modes of use, once the blind 100 is fully collapsed, the skirt 150 can be draped over the seat 130 and upper platform 110 and cinched using the drawstring 152, as shown in FIG. 5. In some example embodiments, the lower platform 120 further comprises one or more carry straps 154 secured across its bottom or lower surface providing a handle to carry the collapsed blind 100 or a strap to easily carry the blind 100 in the compact configuration over the shoulder for example like a backpack.

FIGS. 6-10 show a portable, one-person free-standing blind 200 according to another example embodiment of the present invention. The free-standing blind 200 generally comprises a leg assembly 226 for supporting the blind upon a ground or support surface, a lower platform or portion 220 rotatably mounted to the leg assembly 226, a foldable seat 230 mounted above the lower platform 220, an upper portion 210, struts 214 extendable from the foldable seat 230 to the upper platform 210, and a shroud or canopy 210 for concealing a user seated on the seat 230. The blind 200 is convertible between a disassembled, compact configuration and an assembled, extended configuration in which the blind is roughly cylindrical and sized to accommodate a single user in the assembled, extended configuration. Moreover, the blind 200 is configured and adapted to be manually rotated or maneuvered about a vertical or axial axis by the user while seated on the seat (for example, pushing against the ground with his/her feet to rotate the blind).

As shown in FIGS. 7 and 8, the lower platform 220 includes an orifice 222 on its bottom surface for receiving an upper portion of a vertical post 228 of the leg assembly 226. Preferably, the lower platform is pivotally mounted to the leg assembly to allow the user to freely rotate the blind 200 as desired. In the depicted embodiment, the leg assembly 226 includes three foldable legs extending from the vertical post 228. However, the leg assembly may comprise one, two, or more than three legs. Preferably, the leg assembly 226 is foldable or collapsible for easier storage and transportation.

Figure 10:
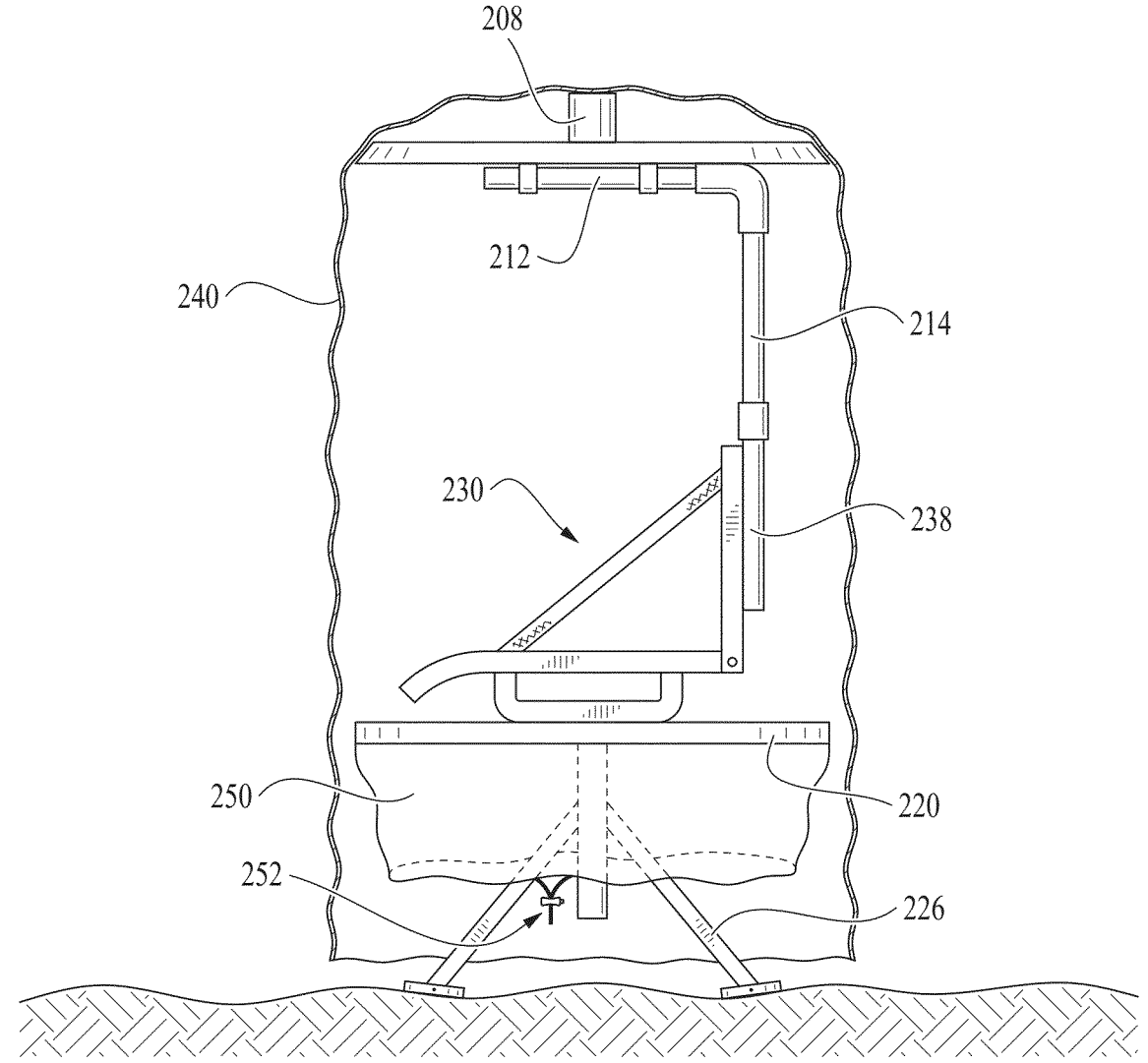
FIG. 10 is a side sectional view of the free-standing blind of FIG. 6.

In example embodiments, the foldable seat 230 is attached or secured to a top surface (opposite the bottom surface) of lower platform 220. Specifically, the foldable seat 230 comprises a folding frame with a lower seat frame portion 232 secured to the top surface of the lower platform 220 and an upper seat frame portion 234 hingeably connected to the lower seat frame portion and moveable between a collapsed position and a substantially upright position. In the upright position, the upper seat frame portion 234 is configured to provide lumber and/or back support to the user when the user is seated in the seat 230. As best shown in FIG. 10, the seat 230 further includes struts 238 attached to the upper seat frame 234, the struts being configured for receiving and supporting support extensions 214.

In example embodiments, the support extensions 214 connect and provide support between the seat 230 and the upper platform 210. As shown in FIGS. 8 and 9F, the upper platform 210 includes upper platform frame members 212 secured to a bottom surface of the upper platform 210. The frame members 212 comprise L-shaped profiles with the upper platform 210 being secured to a first, horizontal portion of the upper platform frame members 212 and a second, vertical portion extending transversely from the horizontal portions, wherein the vertical portions of the upper platform frame members 212 are configured to receive ends of the support extensions 214. In other words, first ends of the support extensions 214 are received by the vertical portions of the upper platform frame members 212 and second ends (opposite the first ends) of the support extensions 213 are received by struts 238, as shown in FIGS. 9F and 10.

The blind 200 further comprises a shroud or cover 240 for concealing a user seated on the seat 230. In example embodiments, the shroud 240 extends from above the upper platform 210 and drapes down towards the lower platform 220. Preferably, the shroud 240 extends to or close to the ground and covers substantially all sides of the blind except for a slit (if desired). Optionally, the shroud may comprise zippers, loop-and-hook fasteners, buttons, or other similar fixtures for opening and closing the slit as needed. Preferably, the exterior of the shroud 240 comprises a pattern or design on at least the exterior surface to help blend in with the surrounding environment during use. For example, the shroud 240 may comprise a camouflage-patterned exterior depicting tree limbs and leaves to help blend in with the surrounding in a wooded area to help conceal the user's presence from animals while hunting or taking photographs. In some example embodiments, the shroud 240 may be configured to have a tapered profile (i.e., narrow to wide from top to bottom) to better mimic the trunk of a tree. Optionally, the blind 200 may be provided with a spacer 208 above the upper platform 210 to create a sloped surface so that precipitation, leaves, and/or other objects falling thereon fall off and do not collect atop the upper platform. This shape also tends to blend in better with the natural environment and thus helps the blind to be less noticeable to wildlife.

As shown in FIGS. 8 and 10, the lower platform 220 includes a skirt 260 secured around the periphery of the lower platform 220. The exposed edge of the skirt 250 is hemmed and a drawstring 252 is threaded therethrough. When use of the blind 200 is no longer needed, it is disassembled by removing the leg assembly 226 from lower platform 220 and the support extensions 214 from between the upper platform 210 and the seat struts 238. With the seat struts 238 removed, the upper seat frame portion 234 can be folded down towards the lower seat frame portion 232. The disassembled leg assembly 226, the support extensions 214, and the upper platform 210 can then be placed atop the folded seat 230. The skirt 250 is then draped over all the disassembled components over the upper platform 210 and cinched using the drawstring 252, as shown in FIG. 5. In some example embodiments, the lower platform 220 further comprises a carry strap 254 secured across its bottom or lower surface providing a handle to carry the collapsed blind 200 or a strap to easily carry the blind 200 in the compact configuration over the shoulder for example like a bag.

According to yet another example embodiment of the present invention, the one-person pivoting blind comprises a backpack, a seat or chair, a semi-round upper structure of a first diameter with a conical upper shape, and a semi-round lower structure of a second diameter equal to or larger than the first diameter secured to the bottom of the seat, wherein the upper and lower semi-round structures are spaced a predetermined or specified distance apart. Preferably, the distance between the upper and lower structures is sufficiently large to accommodate a single person. A camouflage fabric or material encompasses the upper structure and the lower structure and creates an interior space for a person to occupy. The upper structures undulating outer shape coupled with the fabric or material create a three-dimensional shape. The seat is positioned between the upper and lower structures and within the interior space created by the camouflage fabric or material. Preferably, the blind, in its entirety, is configured to pivot or rotate about a vertical or axial axis. In some example embodiments, the seat is suspended from a bracket with a gambrel that connects to a tree with the upper and lower structures and camouflage fabric or material. In other example embodiments, the seat is supported by legs on the ground and is free-standing with the upper structure and camouflage fabric or material supported with brackets connected to the seat.

In other example embodiments, the present invention relates to a portable backpack-and-blind system comprising a backpack configuration and a blind configuration. The portable backpack-and-blind system comprises a backpack and a blind assembly. The blind assembly comprises a rotating chair and a camouflage shroud for concealing a user seated on the chair. The blind assembly is convertible between a disassembled, compact configuration and an assembled, extended configuration. In the backpack configuration, the backpack is configured for encasing and storing therein the blind assembly in the disassembled, compact configuration. In the blind configuration, the blind assembly is roughly cylindrical and sized to accommodate and conceal therein a single user in the assembled, extended configuration. Preferably, in the backpack configuration, the backpack is configured for storing more than the blind assembly. Preferably, the backpack is configured for carrying the backpack over the user's shoulders or by one or more handles.

FIG. 11 shows a hanging blind 300 for securement to a tree or between two trees, according to an example embodiment of the present invention.

Optionally, spring clips can be employed to secure local foliage, branches, leaves, etc. to the tree support structure 170 to help conceal and camouflage those structures. Optionally, as shown generally in FIG. 6 and in FIG. 11, the seat can be a free-standing item and not connected to or supported by the blind.

While the claimed invention has been shown and described in example forms, it will be apparent to those skilled in the art that many modifications, additions, and deletions can be made therein without departing from the spirit and scope of the invention as defined by the following claims.

What is claimed is:

1. A portable, one-person hanging blind comprising a tree support for attachment to a portion of a tree, a generally round upper portion supported by the tree support, a chair suspended beneath the generally round upper portion, and a camouflage shroud draped over the generally round upper portion for concealing a user seated on the chair, the blind being convertible between a compact configuration for carrying and transport and an extended configuration for use, and wherein as a result of the shroud being draped over the generally round upper portion the blind is roughly cylindrical and sized to accommodate a single user therein, and wherein the blind is configured and adapted to be rotated by a user seated on the seat, wherein the camouflage shroud includes a firing opening and one or more viewing windows and wherein the orientation of the firing opening and viewing window relative to the seat can be adjusted to accommodate aiming angles to the left, to the right, or straight ahead, and wherein the camouflage shroud, including a firing opening and the one or more viewing windows can be rotated relative to the ground by the user sitting on the seat and using his or her feet to rotate the seat relative to the ground.

2. The portable blind as claimed in claim 1 wherein the camouflage shroud draped over the generally round upper portion has more fabric than is needed to fit over the generally round upper portion such that it creates folds or scalloping as it drapes toward the ground, giving the appearance of a tree trunk.

3. The portable blind as claimed in claim 2 further comprising an A-frame structure for engaging the tree trunk and wherein arms of the A-frame structure have a length of between about 22 and 30 inches.

4. The portable blind as claimed in claim 3 wherein arms of the A-frame structure have a length of between about 23 and 28 inches.

5. The portable blind as claimed in claim 1 wherein the generally round upper portion has an undulating outer edge such that the camouflage shroud draped over the generally round upper portion creates undulations as it drapes toward the ground, giving the appearance of a natural tree trunk.

6. The portable blind as claimed in claim 1 further comprising a carrying strap for carrying the portable blind in its compact configuration.

7. The portable blind as claimed in claim 6 further comprising a fabric cover for covering and containing substantially all of the portable blind in its compact configuration.

8. The portable blind as claimed in claim 1 wherein the blind is adapted and configured to roughly have the appearance of a trunk of a tree, including a generally wrinkled outer surface.

9. The portable blind as claimed in claim 1 wherein the seat comprises a flexible, foldable fabric seat.

10. The portable blind as claimed in claim 9 wherein the blind further comprises flexible straps extending from the upper portion to a lower portion, with the seat being supported upon the lower portion and supported by the flexible straps.

11. The portable blind as claimed in claim 1 wherein the camouflage shroud includes a window portion and wherein the orientation of the window portion relative to the seat can be adjusted to accommodate aiming angles to the left, to the right, or straight ahead.

12. The portable blind as claimed in claim 1 wherein the roughly cylindrical shape is slightly tapered, with the blind being broader at the bottom than at the top.

13. The portable blind as claimed in claim 1 further comprising a weighted lower skirt.

14. The portable blind as claimed in claim 1 further comprising internal storage pockets positioned on the inside of the blind.

15. The portable blind as claimed in claim 1 wherein the bottom of the blind is open to the ground.

16. The portable blind as claimed in claim 1 wherein the blind can be carried as a backpack and includes one or more carry straps for carrying the blind as a backpack.

* * * * *